Sept. 24, 1935.  H. HARGREAVES  2,015,142
CITROUS FRUIT SERVER
Filed April 19, 1935
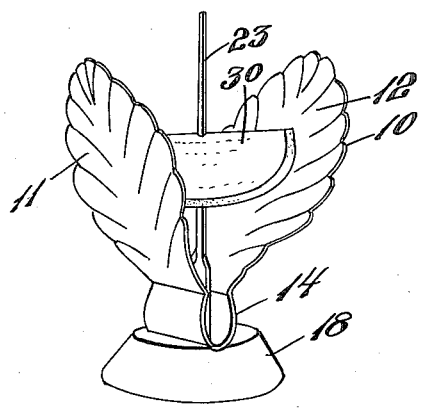
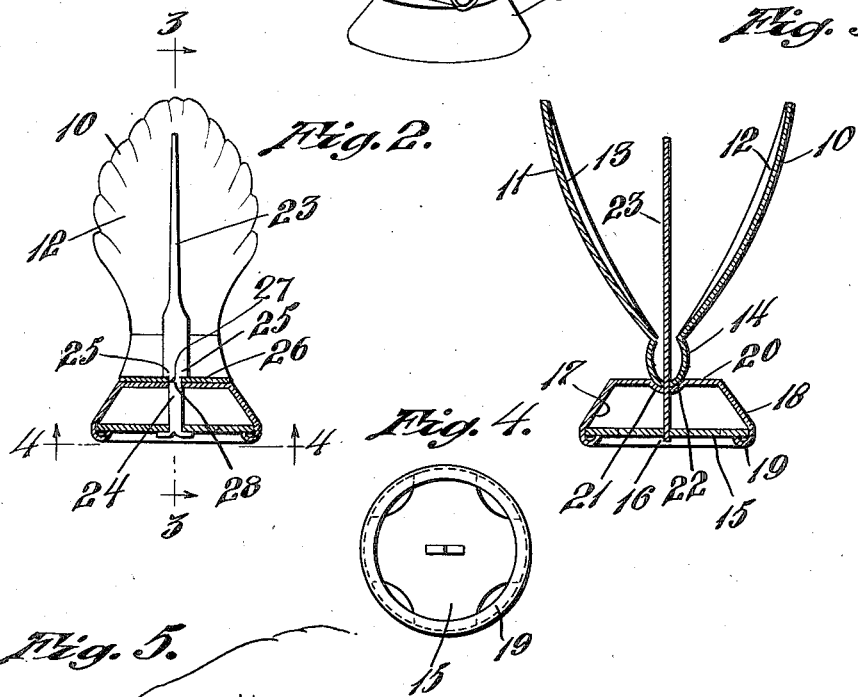
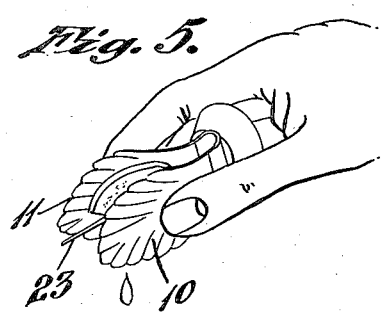
INVENTOR.
Henry Hargreaves
BY Barlow & Barlow
ATTORNEYS.

Patented Sept. 24, 1935

2,015,142

UNITED STATES PATENT OFFICE 2,015,142

CITROUS FRUIT SERVER

Henry Hargreaves, Providence, R. I., assignor to Hargreaves and Marshall, Providence, R. I., a firm composed of Henry Hargreaves and George Marshall Application April 19, 1935, Serial No. 17,226

4 Claims. (Cl. 100—41)

This invention relates to a citrous fruit server designed for table use, and has for one of its objects the supporting of a section or slice of lemon or similar fruit so that it may be picked up and the juice squeezed therefrom without the user touching the fruit in the device.

Another object of the invention is to provide a squeezer so mounted as to stand and hold the slice of fruit upright when placed upon a horizontal surface.

A further object of the invention is to provide a squeezer which in addition to its usefulness will be attractive and ornamental to assist in decorating of the dining table.

Other objects consist of simplicity and certain novel features of construction which will be specifically described and particularly pointed out in the appended claims.

In the accompanying drawing:

Fig. 1 is a perspective view showing the device with a slice of fruit in position as served at the dining table;

Fig. 2 is an elevation partly in section;

Fig. 3 is a section on line 3—3 of Figure 2;

Fig. 4 is a bottom view; and

Fig. 5 is a perspective showing how the device is used.

In the use of lemon for flavoring food, the handling of a slice is objectionable and also frequently difficult, and in order that these undesirable effects may be eliminated, I have provided a device which will support a piece of citrous fruit up away from and out of contact with the table and yet may be easily picked up and manipulated to exude some of the juice from the slice of fruit without the fingers of the user contacting the slice of fruit; and the following is a detailed description of the preferred means by which these advantageous results may be accomplished:

Referring to the drawing, the device consists of a pair of complemental plate members 10 and 11 having concave inner surfaces 12 and 13 and an irregular contour resembling somewhat a scalloped shell. These plate members are integrally connected by a resilient U-shaped portion 14 and as these plates are moved towards each other the U-shaped portion is placed under tension which, when pressure is released, causes the plates to open up again and resume the position shown in Figure 1.

A base 18 consists of an inverted cup providing a top wall 20 with a tapered side wall 17 and a bottom wall 15 abuts against the inner surface of a tapered wall 17 and is secured in place by the rolled edge 19 thereof.

The top wall 20 of the base 18 is recessed centrally as at 21 and conforms to the shape of the lower portion 22 of the U-shaped portion 14 which is seated therein. A spike 23 which is designed to pierce and hold a slice of fruit is centrally located between the plates 10 and 11 and has a reduced portion 24 which provides shoulders 25 to bear on the surface 26 about an opening 27 in the U-shaped portion 14. This reduced portion 24 extends through the opening 27 in the resilient portion, through an opening 28 in the recess 21 and through opening 16 in the bottom wall and is there riveted over the bottom surface of the plate 15 which firmly secures all the parts together. The recess 21 locates and prevents the plates from turning on the surface 20 of the base 18.

The fruit slice 30 is positioned on the spike 23 previous to being served and pressure on the plates will squeeze the slice which eliminates the fingers of the diner from coming in contact with the sliced fruit.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A lemon slice squeezer comprising a base provided with a top and bottom wall, a pair of plate members resiliently connected and mounted on said top wall, and a spike positioned between said plate members and having a shoulder thereon bearing against said resilient connection, and a portion extending through the connecting top wall and bottom wall and riveted to the bottom of the base to hold all three parts together.

2. A lemon slice squeezer comprising a base having a top wall provided with a recess therein, a pair of plate members resiliently connected and movable toward each other to compress a slice of lemon placed therebetween, and means for mounting and securing said plate members in said recess.

3. A lemon slice squeezer comprising a base having a top wall provided with a recess therein, a pair of plate members connected by a resilient U-shaped portion and movable toward each other to compress a slice of lemon placed therebetween, and means for securing said U-shaped portion in said recess.

4. A lemon slice squeezer comprising a base having a top wall provided with a recess having an opening therein, a pair of plate members integrally connected by a resilient U-shaped portion and movable towards each other to compress a slice of lemon placed between therein, a bottom wall on said base provided with an opening therein, and a spike positioned centrally of said base and located between said plate members, said spike having a reduced portion extending through said U-shaped portion and through said openings and secured to said bottom wall.

HENRY HARGREAVES.